(No Model.)
T. S. LIGON.
PAN LIFTER.
No. 496,422.      Patented May 2, 1893.
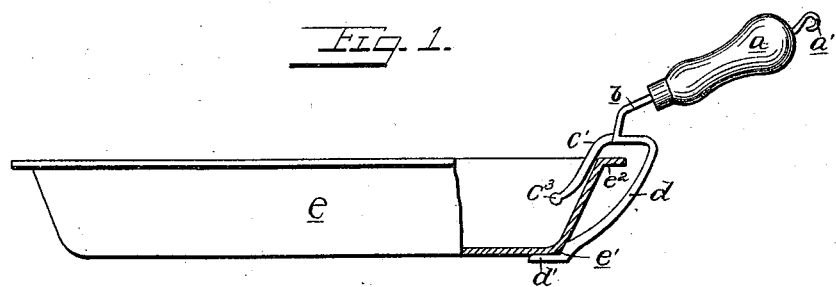
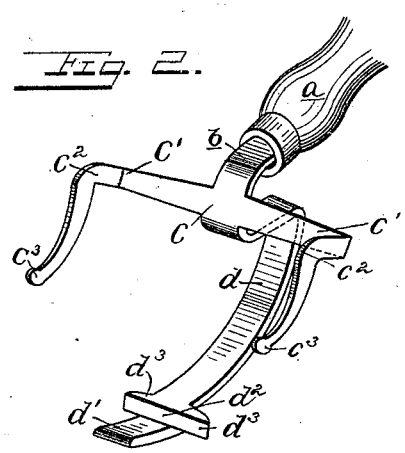
WITNESSES,
Annie A. Lansdale.
Thomas S. Ligon.
INVENTOR.
ATTY.

UNITED STATES PATENT OFFICE.

THOMAS SANDERSON LIGON, OF DOLARK, ARKANSAS, ASSIGNOR OF ONE-HALF TO B. B. TIMBERLAKE.

PAN-LIFTER.

SPECIFICATION forming part of Letters Patent No. 496,422, dated May 2, 1893.

Application filed August 9, 1892. Serial No. 442,635. (No model.)

*To all whom it may concern:*

Be it known that I, THOMAS SANDERSON LIGON, a citizen of the United States, residing at Dolark, in the county of Dallas and State of Arkansas, have invented certain new and useful Improvements in Pan-Lifters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to pan lifters and has relation more particularly to that class of pans known as grease pans used on and in cooking stoves. To take one of the grease pans out or off of a cooking stove when it is hot is at considerable risk to the hands, so I have invented this pan lifter to save the hands from being burned and disfigured and to save the pain and annoyance consequent to such accidents.

In the accompanying drawings: Figure 1, shows my lifter in the act of lifting a pan. Fig. 2, is a perspective view of my lifter.

My invention is described as follows:

$a$, represents the handle provided with a hook, $a'$, to hang the lifter up by when not in use.

$b$, is the stem which fits into the handle $a$.

The handle $a$, may be made of wood or other suitable material, but it would perhaps be as cheap to make the handle and hook of metal and integral with the stem $b$, and then the whole lifter perhaps could be stamped out at one blow and afterward bent in shape.

$c$, represents a cross beam integral with and extending from each side of the stem, $b$. Each end of said cross beam at a distance of about one and a half inches from the center of the stem is turned squarely forward forming elbows, $c'$, and then at a distance of about one-half inch from said elbows, said arms are turned squarely down forming elbows $c^2$, and the ends, $c^3$, of said arms are then turned slightly forward so that said arms will more readily and certainly pass on the inside of the pan when attempting to grasp the same. From the lower edge of said crossbeam $c$, extends a shank $d$, curved backward having its lower end turned forward forming a foot, $d'$. At the lower end of said shank and at the heel of said foot is an abutment, $d^2$, having on each side extensions, $d^3$, for the lower rim, $e'$, of the pan, $e$, to rest against.

The operation of my lifter is apparent. The points, $c^3$, are put on the inside of the pan. The foot, $d'$, thrust under the pan until the abutment, $d^2$, rests against the lower rim of the same. The extensions, $d^3$, assist the arms, $c^3$, in holding the pan steadily while it is being moved from the stove.

Having described my invention, what I claim as new, and desire to secure by Letters Patent, is—

A pan lifter having the shank $b$, cross-piece $c$, its ends turned forward and downward to impinge the inner face of a pan, its middle piece $d$, bent backward, making room for the rim of a pan, then downward and forward to impinge the outer face and bottom thereof, and abutment $d^2$, secured to piece $d$, adapted to impinge the lower periphery of a pan to prevent it from turning, substantially as shown and described and for the purposes set forth.

In testimony whereof I affix my signature in presence of two witnesses.

THOMAS SANDERSON LIGON.

Witnesses:
W. G. EVANS,
B. B. TIMBERLAKE.